(12) United States Patent
Koma (10) Patent No.: US 8,931,595 B2
(45) Date of Patent: Jan. 13, 2015

(54) GREASE PACKING JIG FOR BEARING

(75) Inventor: Masaya Koma, Kuwana (JP)

(73) Assignee: NTN Corporation, Osaka (JP)

( * ) Notice: Subject to any disclaimer, the term of this patent is extended or adjusted under 35 U.S.C. 154(b) by 369 days.

(21) Appl. No.: 13/382,228

(22) PCT Filed: Jun. 29, 2010

(86) PCT No.: PCT/JP2010/061032
§ 371 (c)(1),
(2), (4) Date: Jan. 4, 2012

(87) PCT Pub. No.: WO2011/007665
PCT Pub. Date: Jan. 20, 2011

(65) Prior Publication Data
US 2012/0132482 A1    May 31, 2012

(30) Foreign Application Priority Data

Jul. 13, 2009  (JP) .................................. 2009-164880

(51) Int. Cl.
*F16N 3/10*   (2006.01)
*F16C 1/24*   (2006.01)
(Continued)

(52) U.S. Cl.
CPC ............... *F16N 11/04* (2013.01); *F16N 11/02* (2013.01); *F16N 37/003* (2013.01)
USPC ........................................................ 184/5.1

(58) Field of Classification Search
CPC ...... F16N 37/003; F16N 3/10; F16C 33/6622
USPC ........................................................ 184/5.1
See application file for complete search history.

(56) References Cited

U.S. PATENT DOCUMENTS 1,505,776 A * 8/1924 Glade, Jr. ...................... 384/474
2,248,940 A * 7/1941 Berg .............................. 184/5.1
(Continued)

FOREIGN PATENT DOCUMENTS

| CN | 201232842 | 5/2009 |
|---|---|---|
| JP | 58-53239 | 11/1983 |
| JP | 62-39135 | 2/1987 |
| JP | 10-26296 | 1/1998 |

(Continued)

OTHER PUBLICATIONS

International Preliminary Report on Patentability issued Feb. 16, 2012 in International (PCT) Application No. PCT/JP2010/061032.
(Continued)

*Primary Examiner* — William E Dondero
*Assistant Examiner* — Mark K Buse
(74) *Attorney, Agent, or Firm* — Wenderoth, Lin & Ponack, L.L.P.

(57) ABSTRACT

A grease packing jig includes: a support table on which a bearing is placed; a disc-shaped inner lid placed on an inner ring of the bearing; an upper lid, and pressers arranged to engage with an upper surface of the upper lid. The upper lid is disc-shaped, has a larger diameter than the inner lid, has a grease pumping port and has a lower surface formed with an inner lid housing recess so as to leave a grease pumping space between the lower surface and an upper surface of the inner lid as well as between the lower surface and an outer circumferential surface of the inner lid. Grease can be packed into a gap space in the bearing from a grease packing port provided between an inner circumferential surface of the inner lid housing recess and the outer circumferential surface of the inner lid.

11 Claims, 10 Drawing Sheets

(51) Int. Cl.
*F16N 11/04* (2006.01)
*F16N 11/02* (2006.01)
*F16N 37/00* (2006.01)

(56) References Cited

U.S. PATENT DOCUMENTS

| | | | | |
|---|---|---|---|---|
| 2,309,820 | A * | 2/1943 | Berg | 184/5.1 |
| 2,599,456 | A * | 6/1952 | Ivie | 184/5.1 |
| 3,724,596 | A * | 4/1973 | Freda | 184/5.1 |
| 2005/0175268 | A1 | 8/2005 | Latham | |
| 2010/0294596 | A1 * | 11/2010 | Yang | 184/5.1 |

FOREIGN PATENT DOCUMENTS

| | | |
|---|---|---|
| JP | 2001-241453 | 9/2001 |
| JP | 2003-239998 | 8/2003 |
| JP | 2008-297510 | 12/2008 |

OTHER PUBLICATIONS

International Search Report issued Jul. 27, 2010 in International (PCT) Application No. PCT/JP2010/061032.

Chinese Office Action issued on Dec. 23, 2013 in corresponding Chinese Patent Application No. 201080030741.4 (with partial English translation).

* cited by examiner

GREASE PACKING JIG FOR BEARING

BACKGROUND OF THE INVENTION

1. Technical Field

The present invention relates to a grease packing jig for a bearing which has rolling elements arranged equidistantly on an outer circumferential surface of an inner ring by means of a retainer. The jig is used for packing grease into gaps between the bearing's inner ring and rolling elements.

2. Background Art

Figure 10:
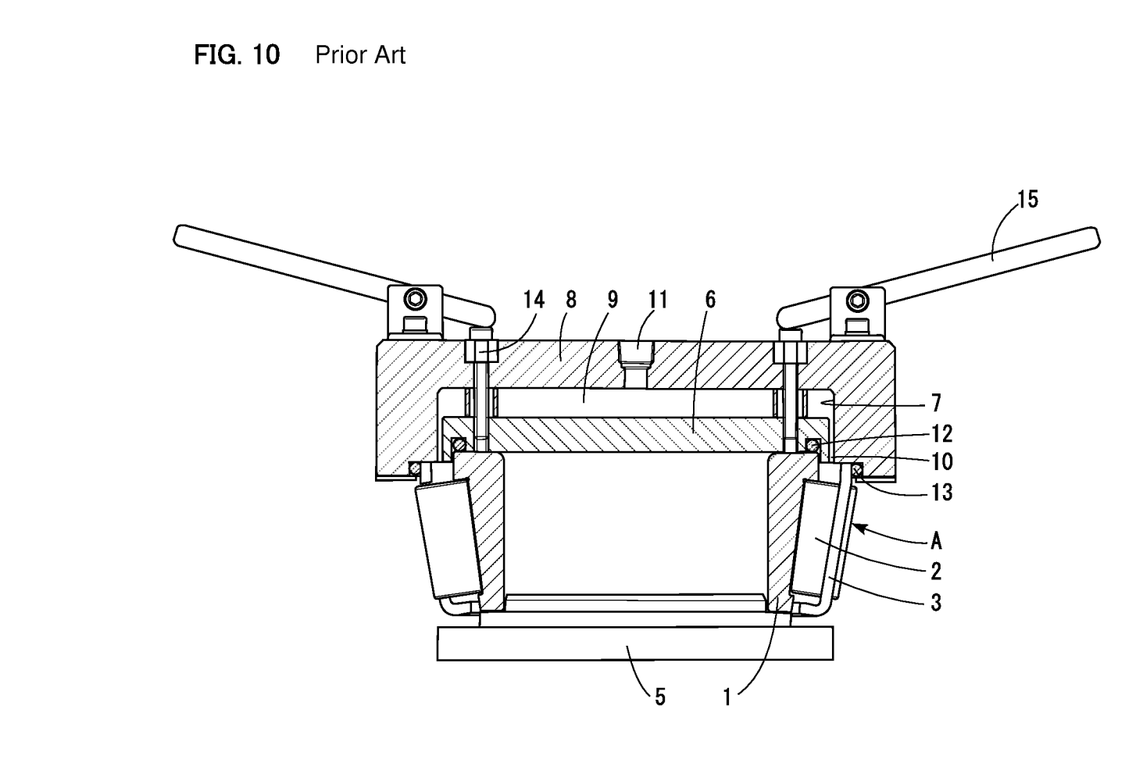
FIG. 10 is a fragmentary sectional front view of a conventional grease packing jig, showing an assembled state thereof.

Grease packing jigs are disclosed in JP-A S62-39135 and JP-A H10-26296. FIG. 10 shows a typical conventional grease packing jig for bearings.

The grease packing jig is for a type of bearings such as a bearing A in which a plurality of rolling elements (tapered rollers) 2 are arranged at an equal interval on an outer circumferential surface of an inner ring 1 by means of a retainer 3. The jig includes a support table 5 for placing the bearing, with a small-flange side of the inner ring 1 faced downward; an inner lid 6 for placing on a large-flange-side end surface of the inner ring 1; and an upper lid 8 which has a lower surface formed with an inner lid housing recess 7. The inner lid 6 is housed in the inner lid housing recess 7 of the upper lid 8 to provide a grease packing space 9 above an upper surface and around an outer circumferential surface of the inner lid 6, and a grease packing port 10 as a gap between the outer circumferential surface of the inner lid 6 and an inner circumferential surface of the inner lid housing recess 7.

At a center of the upper lid 8, a grease pumping port 11 is provided to pump grease into the grease packing space 9. Grease which is pumped from the grease pumping port 11 into the grease packing space 9 under a pressure finds its ways into spaces between the inner ring 1, the tapered rollers 2 and the retainer 3.

The inner lid 6 has its lower surface outer circumferential edge formed with an annular groove for fitting an O-ring 12. During the greasing operation, the O-ring 12 prevents grease leakage from between the end surface of the inner ring 1 and the surface of the inner lid 6 contacted thereto.

Also, the upper lid 8 has its lower end surface formed with a stepped portion for fitting an O-ring 13. This O-ring 13 provided at the stepped portion makes contact with an outer circumferential surface of the retainer 3, to prevent grease leakage from between the contacting surfaces of the upper lid 8 and the retainer 3.

The inner lid 6 and the upper lid 8 are fixed integrally with each other by bolts 14. The upper lid 8 has its upper surface provided with handles 15.

SUMMARY OF THE INVENTION

1. Technical Problem

In a grease packing jig constructed as shown in FIG. 10, the inner lid 6 and the upper lid 8 are fixed together with the bolts 14. The inner lid 6 and the upper lid 8 thus integrated with each other are placed on an upper surface of the inner ring 1, and the greasing operation is performed under this state.

In the greasing operation, grease is pumped through the grease pumping port 11 of the upper lid 8 to the grease packing space 9 under a pressure. The pressurized grease finds its ways to narrow grease packing spaces between the inner ring 1, the rolling elements 2 and the retainer 3.

In this operation, the pumping pressure to send the grease to the grease packing space 9 must be strong to supply grease into the grease packing space sufficiently. The strong grease pressure can lift the inner lid 6 and the upper lid 8, causing the grease to leak if the inner lid 6 and upper lid 8 are not heavy enough.

Conventionally, it is therefore necessary to make the inner lid 6 and the upper lid 8 heavy.

However, the heavy inner lid 6 and the heavy upper lid 8 are a burden to operating personnel when setting the grease packing jig.

Also, the heavy inner lid 6 and the heavy upper lid 8 can be a cause of injury if they are mistakenly dropped during the operation.

It is therefore an object of the present invention to provide a grease packing jig which has light-weight inner and upper lids yet is capable of preventing the inner lid and the upper lid from being lifted during the greasing operation.

2. Solution to the Problem

In order to solve the problems described above, the present invention provides a grease packing jig for bearing, which includes: a support table for placing a bearing which has a plurality of rolling elements arranged equidistantly on an outer circumferential surface of an inner ring by means of a retainer, with an end surface of the inner ring faced downward; a disc-shaped inner lid for placing on another end surface of the inner ring; and an upper lid which is disc-shaped, has a larger diameter than the inner lid, a grease pumping port, and a lower surface formed with an inner lid housing recess for housing the inner lid while leaving a grease pumping space between itself and an upper surface of the inner lid as well as between itself and an outer circumferential surface of the inner lid, for packing grease into a gap space in the bearing from a grease packing port provided between an inner circumferential surface of the inner lid housing recess in the upper lid and the outer circumferential surface of the inner lid. With the arrangement described above, the support table is provided with a presser arranged to engage with an upper surface of the upper lid for pressing the upper lid downward.

The presser may include a holding rod provided at least at two locations on an upper surface of the support table in a manner to pivot outwardly with respect to the support table, and a holding plate to be engaged with the upper surface of the upper lid for pressing the upper surface of the upper lid with a spring when the rod is raised to an upright position.

It is preferable that the pressers are disposed equiangularly on an outer periphery of the upper surface of the support table. For example, if two pressers are used, the two should be disposed at a 180-degree interval; if three are used, the three should be disposed at a 120-degree interval; and if four are used, the four should be disposed at a 90-degree interval.

Also, the upper lid includes engagement plates each fixed to the upper surface of the upper lid to extend out of an outer circumference of the upper lid. Each engagement plate has its extended portion formed with a cutout for engagement by a portion of the holding rod below the holding plate when the rod is raised to the upright position. The arrangement makes it easy to engage the holding plates of the holding rods with the upper surface of the upper lid.

In order to make the engaging operation even easier, it is desirable that each of the engagement plates has its tip formed with a tapered guide on its upper surface side.

Preferably, each of the holding rods has an upper end provided with an adjusting nut for adjustment of a spring force from the spring.

The inner lid has a lower surface formed with a positioning-purpose annular wall for insertion along an inner circumference of the inner ring. This makes it easy to align the inner lid and the inner ring with each other.

Alternatively, the presser may include: a holding rod provided at least at two locations on an upper surface of the support table in a manner to pivot outwardly with respect to the support table, and a holding plate to be engaged with the upper surface of the upper lid for pressing the upper surface of the upper lid with a tightening force of a nut when the rod is raised to an upright position.

The nuts are provided by wing nuts. This makes it easy to tighten the nuts.

3. Advantageous Effects of the Invention

The grease packing jig according to the present invention has pressers on the support table, for engagement with an upper surface of the upper lid in order to press the upper lid downward with spring forces or nut tightening forces. This prevents grease leakage even if the upper lid is not pressed down by hand during grease packing procedure.

This enables weight reduction in the upper lid and the inner lid, thereby reducing burden on the workers and preventing injury during operation.

DETAILED DESCRIPTION OF THE INVENTION

Hereinafter, embodiments of the grease packing jig for bearing according to the present invention will be described with reference to the attached drawings.

FIG. 1 through FIG. 6 show a first embodiment of the grease packing jig for bearing according to the present invention.

Figure 1:
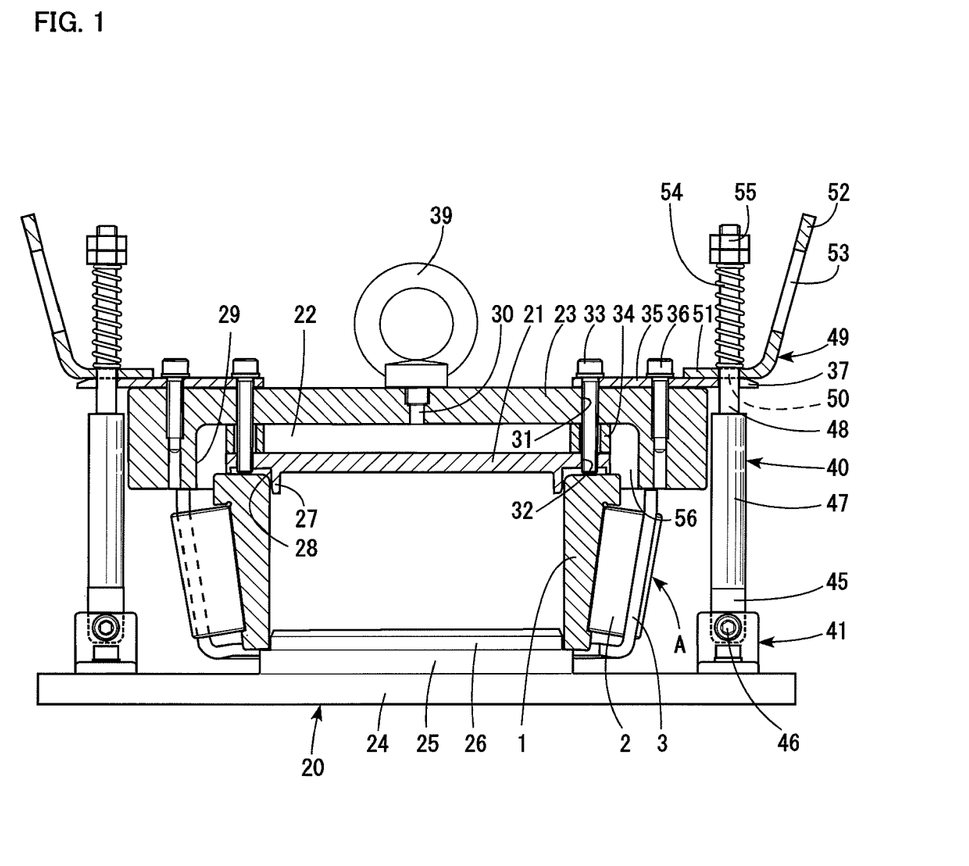
FIG. 1 is a fragmentary sectional front view of a grease packing jig according to a first embodiment of the present invention, showing an assembled state thereof.

The grease packing jig for bearing according to the present invention is for a type of bearings such as a bearing A, which includes an inner ring 1, and a plurality of rolling elements 2 arranged on an outer circumferential surface of the inner ring 1 equidistantly by means of a retainer 3. Grease is packed in spaces between the inner ring 1, the retainer 3 and the rolling element 2. In this embodiment, the rolling elements 2 are provided by tapered rollers.

The grease packing jig can be roughly divided into the following components: a support table 20 on which the bearing A is placed; a disc-shaped inner lid 21 which is placed on an end surface of the inner ring 1 of the bearing A; and an upper lid 23 to be capped over the inner lid 21 to provide a grease pumping space 22 between itself and an upper surface as well as between itself and an outer circumferential surface of the inner lid 21.

The support table 20 has a three-tier structure composed of a circular table plate 24; a circular inner ring placement seat 25 provided at an upper surface center of the table plate 24; and an inner ring fitting portion 26 provided at an upper surface center of the inner ring placement seat 25 for fitting to an inner circumferential surface of the inner ring 1.

In this embodiment the rolling elements 2 are provided by tapered rollers. When setting the bearing on the support table 20, a small-flange side of the inner ring 1 is faced downward, with a large-flange side facing upward.

The inner lid 21 is disc-shaped and has a slightly smaller diameter than an outer diameter of the end surface of the inner ring 1. With the inner lid 21 placed on a large-flange-side end surface of the inner ring 1, the large-flange-side end surface of the inner ring 1 has its outer circumferential edge slightly extending beyond an outer circumference of the inner lid 21.

On a lower surface of the inner lid 21, there is provided an annular positioning wall 27, which is to be fitted to an inner circumferential surface of the inner ring 1. By fitting this annular wall 27 of the inner lid 21 along the inner circumference of the inner ring 1, positioning of the inner lid 21 and the inner ring 1 are established.

An annular groove 28 is formed between an outer circumferential edge of the lower surface of the inner lid 21 and the annular wall 27.

The upper lid 23 is disc-shaped, has a larger diameter than the inner lid 21, and has a lower surface formed with an inner lid housing recess 29 for accommodating an upper portion of the inner ring 1 and the inner lid 21 with a predetermined gap.

At a center region of the upper lid 23, a grease pumping port 30 is provided for pumping grease into the inner lid housing recess 29.

The upper lid 23 and the inner lid 21 are provided with bolt holes 31, 32, at locations corresponding to the end surface of the inner ring 1. Bolts 33 are threaded from the upper-surface side of the upper lid 23 to align and fix the upper lid 23 to the inner lid 21. A positioning ring 34 is fitted around each bolt 33, between a lower surface of the inner lid housing recess 29 in the upper lid 23 and an upper surface of the inner lid 21. The positioning rings 34 maintain a predetermined distance between the upper lid 23 and the inner lid 21. Also, the positioning rings 34 prevent grease leakage from around the bolts 33 while grease is pumped into the inner lid housing recess 29.

Figure 3:
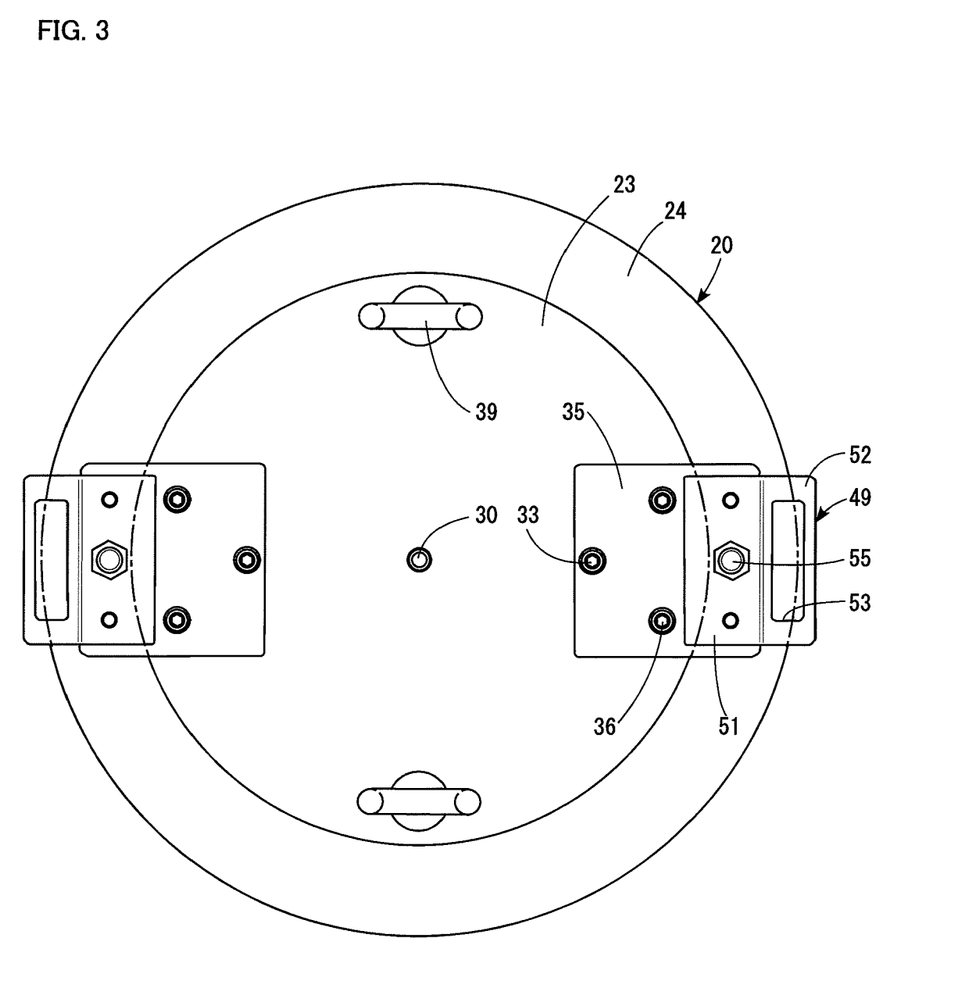
FIG. 3 is a plan view of the embodiment in FIG. 1, showing an assembled state thereof.
Figure 6:
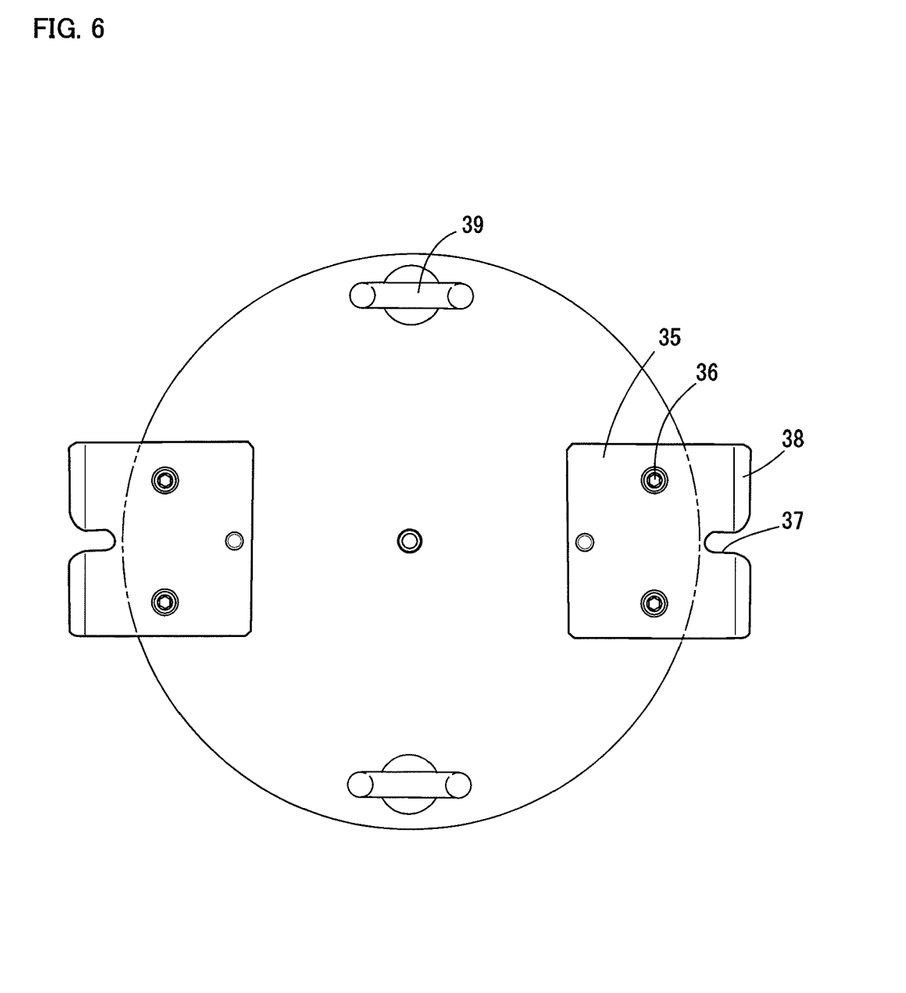
FIG. 6 is a plan view of an upper lid in the embodiment in FIG. 1.

As shown in FIG. 3 and FIG. 6, a rectangular engagement plate 35 is fixed with two bolts 36 in a left region as well as in a right region of the upper surface of the upper lid 23. The bolts 33 which connect the upper lid 23 and the inner lid 21 with each other are threaded from above these engagement plates 35 into respective bolt holes 31 in the upper lid 23 and bolt holes 32 in the inner lid 21.

As shown in FIG. 6, each engagement plate 35 is fixed to the upper lid 23 so that part thereof extends outward beyond the outer circumferential edge of the upper lid 23. The extended part has its center region formed with an outward opening cutout 37. Also, the extended portion of the engagement plate 35 has its extended edge formed with a tapered guide 38 on its upper surface.

Lifting eyes 39 are attached to the upper surface of the upper lid 23, at locations near the outer circumference identified by a centerline drawn vertically to a line connecting the left and right engagement plates 35.

On left and right regions of the table plate 24 in the support table 20, holding rods 40 are provided in rod brackets 41 pivotally in left and right directions correspondingly, while the inner lid 21 and the upper lid 23 are placed onto the end surface of the inner ring 1, to the cutouts 37 made at respective center regions of the extended portions of the engagement plates 35 which are fixed to left and right regions of the upper lid 23.

Figure 4:
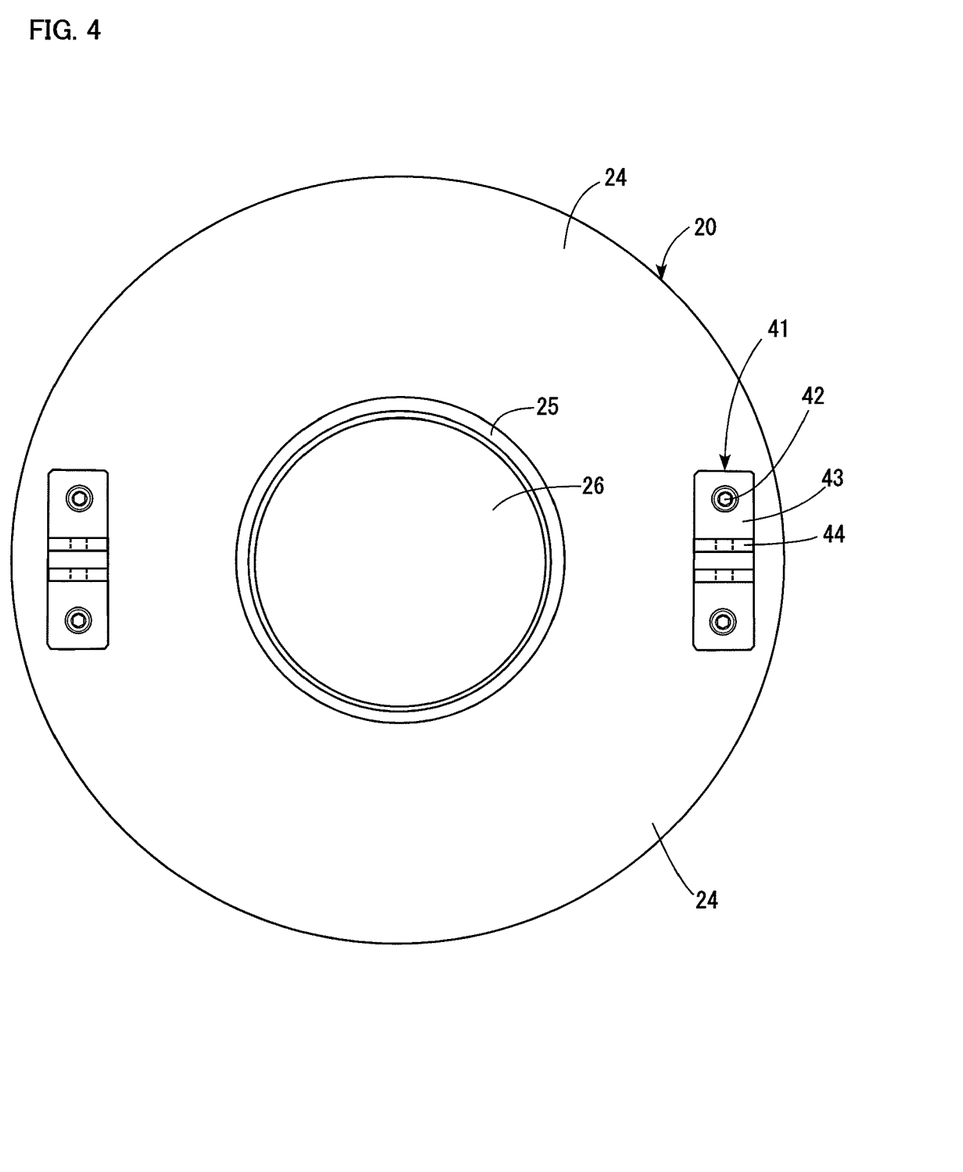
FIG. 4 is a plan view of a support table in the embodiment in FIG. 1.
Figure 5:
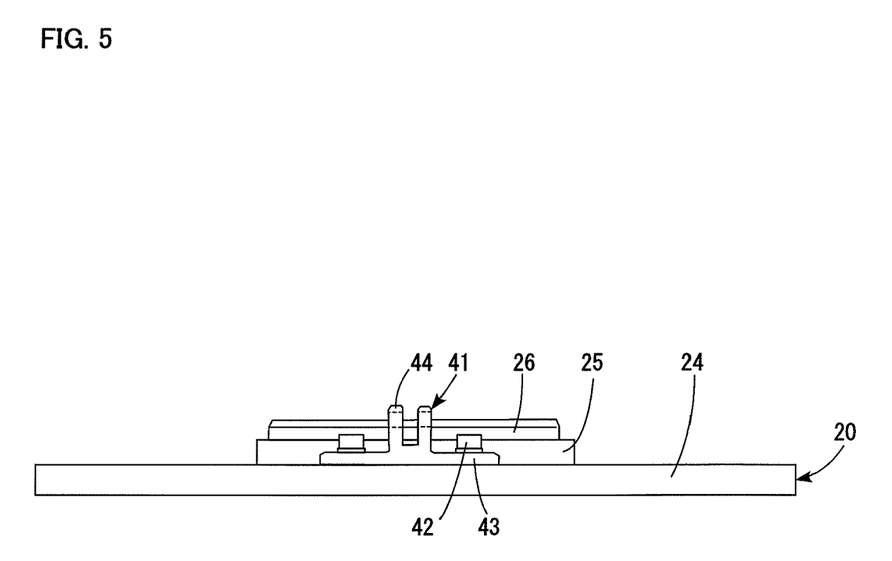
FIG. 5 is a right side view of the support table in the embodiment in FIG. 1.

As shown in FIG. 4, each rod bracket 41 has a base plate portion 43 fixed to the table plate 24 of the support table 20 with fixing bolts 42; and a pair of upright walls 44 to sandwich a lower end of the holding rod 40 from two sides.

Figure 2:
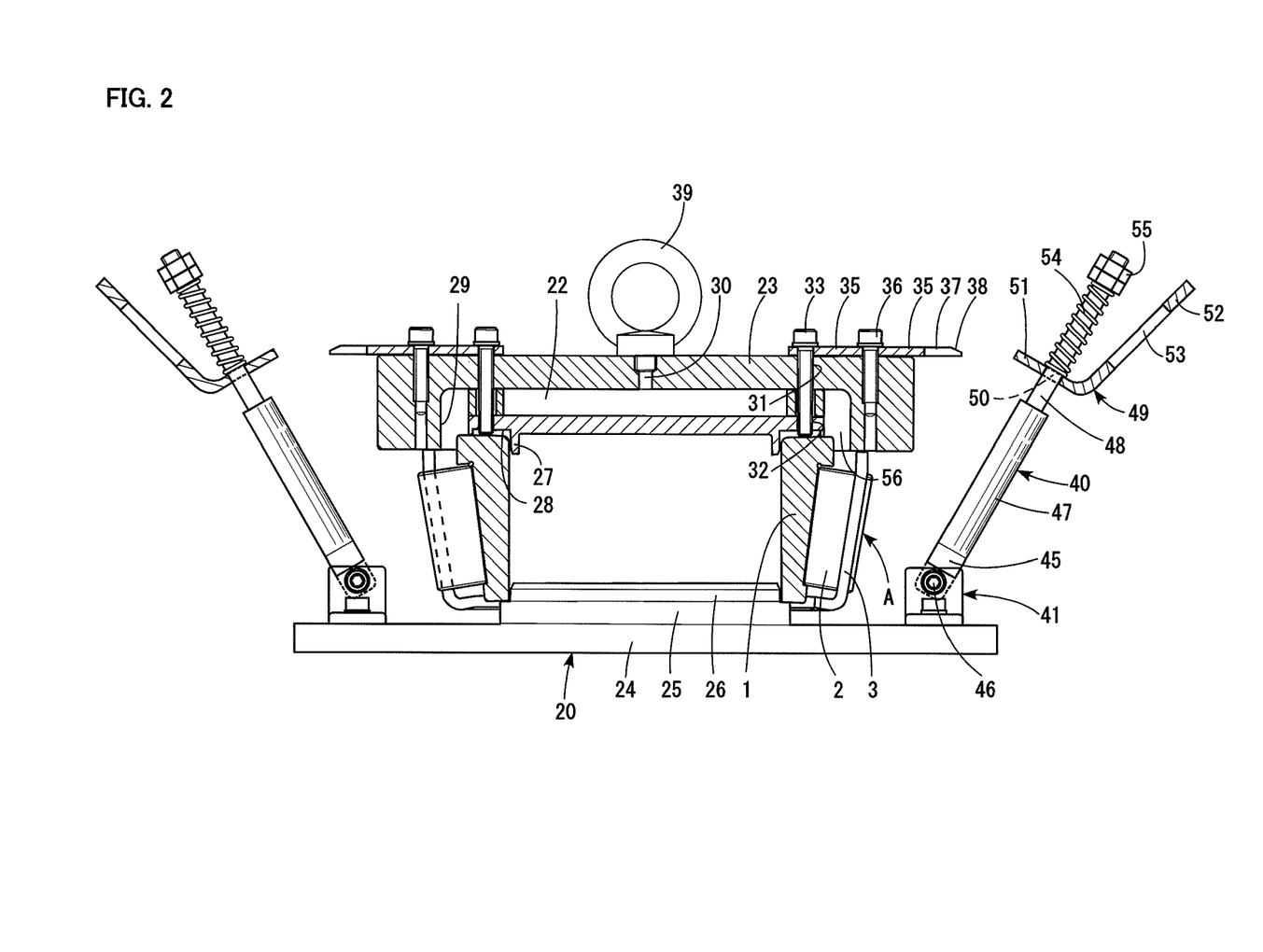
FIG. 2 is a front view of the embodiment in FIG. 1, showing a state where pressers are opened in left-right directions.

The holding rod 40 has its lower end flattened to be a platy portion 45. The platy portion 45 is inserted between the upright walls 44 of the rod bracket 41, and is held there pivotally in the left and right directions by a bolt 46 as shown in FIG. 2.

Each holding rod 40 has a large diameter portion 47 and a small diameter portion 48. As shown in FIG. 2, the holding rod 40 can be opened to the left or right, and from this state, the holding rod 40 can be pivoted to upright positions, so that a lower region of the small diameter portion 48 is fitted, as shown in FIG. 1, into the cutout 37 formed in the extended portion of the engagement plate 35.

A holding plate 49 is attached to the small diameter portion 48 of each holding rod 40 movably in axial direction of the small diameter portion 48. The holding plate 49 has an insertion hole 50 for inserting the small diameter portion 48 of the holding rod 40.

The holding plate 49 has a horizontal plate portion 51 to be placed on the upper surface of the engagement plate 35 when the small diameter portion 48 of the holding rod 40 is fitted into the cutout 37 in the engagement plate 35; and a slanted plate portion 52 tilting outward. The slanted plate portion 52 has a grip hole 53.

A coil spring 54 is provided around the small diameter portion 48 of the holding rod 40 to press the holding plate 49 inserted around the small diameter portion 48, downward.

The small diameter portion 48 of the holding rod 40 has a tip portion formed with a male thread. A pressure nut 55 is threaded around the male thread portion so that the spring load exerted by the coil spring 54 is adjustable by changing the amount of tightening of the pressure nut 55.

Next, a greasing procedure with the grease packing jig according to the first embodiment will be described.

First, as shown in FIG. 2, the holding rods 40 are opened in the left-right directions, and under this state a bearing A is placed so that its inner ring 1 is on the inner ring placement seat 25 of the support table 20, and the inner ring fitting portion 26 is fitted along the inner circumference of the inner ring 1.

Next, with the inner lid 21 housed in the inner lid housing recess 29 formed in the lower surface of the upper lid 23, the annular groove 28 in the lower surface of the inner lid 21 is fitted to the inner circumferential surface of the inner ring 1, whereby the inner lid 21 has been placed on the end surface of the inner ring 1. This establishes a contact between the upper lid 23 and the end surface of the retainer 3, along the lower end outer circumferential surface around the inner lid housing recess 29.

Thereafter, as shown in FIG. 1, the holding rods 40 which are in the open state are pivoted to their raised positions, bringing the small diameter portions 48 of the holding rods 40 engaged with the cutouts 37 in the engagement plates 35 provided on the upper surface of the upper lid 23. In this step, the holding plates 49 may be grabbed by the grip holes 53 provided in the slanted plate portions 52 so that tips of the horizontal plate portions 51 of the holding plates 49 can be lifted slightly in order to move the horizontal plate portions 51 of the holding plates 49 along the tapered guide 38 provided at the end of the engagement plate 35, so that the small diameter portions 48 of the holding rods 40 can be fitted smoothly into the cutouts 37 in the engagement plate 35 on the upper surface of the upper lid 23. Thereupon, the coil springs 54 in the holding rods 40 exert pressure to the holding plates 49 to press the engagement plates 35.

Then, grease is pumped from the grease pumping hole 30 located at the center of the upper lid 23. Since the upper lid 23 and the inner lid 21 are pressed by the coil springs 54 of the holding rods 40, the pressurized grease does not lift the upper lid 23 or the inner lid 21. Thus, the grease finds its ways through the grease packing port 56 provided by the outer circumferential surface of the inner lid 21 and the inner circumferential surface of the inner lid housing recess 29 while the upper lid 23 and the inner lid 21 are prevented from lifting.

This embodiment offers excellent operability since simple operation of pivoting the holding rods 40 from the open state to the upright state will bring the upper lid 23 and the inner lid 21 into the state of being pressed by the spring forces from the coil springs 54.

Also, since the upper lid 23 and the inner lid 21 are pressed by spring forces from the coil springs 54, there is no need for the human operator to use his hand to hold down the upper lid 23 and the inner lid 21 for prevention of grease leakage unlike in conventional jigs. The arrangement also makes it possible to reduce the weight of the upper lid 23 and of the inner lid 21.

Figure 7:
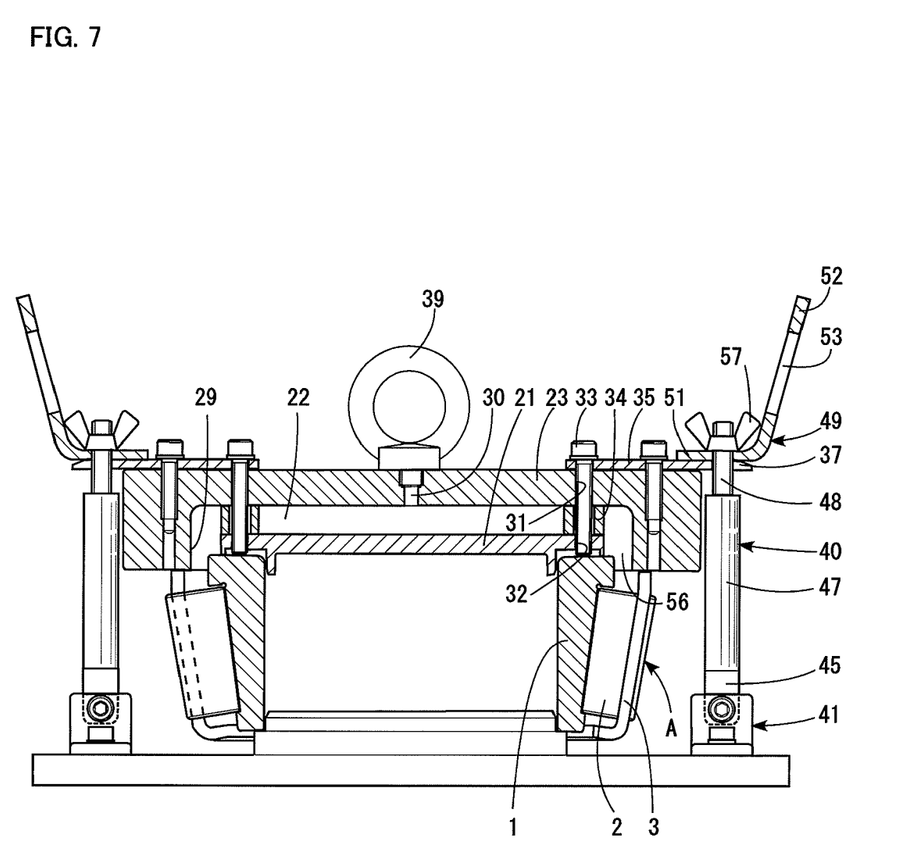
FIG. 7 is a fragmentary sectional front view of a grease packing jig according to a second embodiment of the present invention, showing an assembled state thereof.
Figure 8:
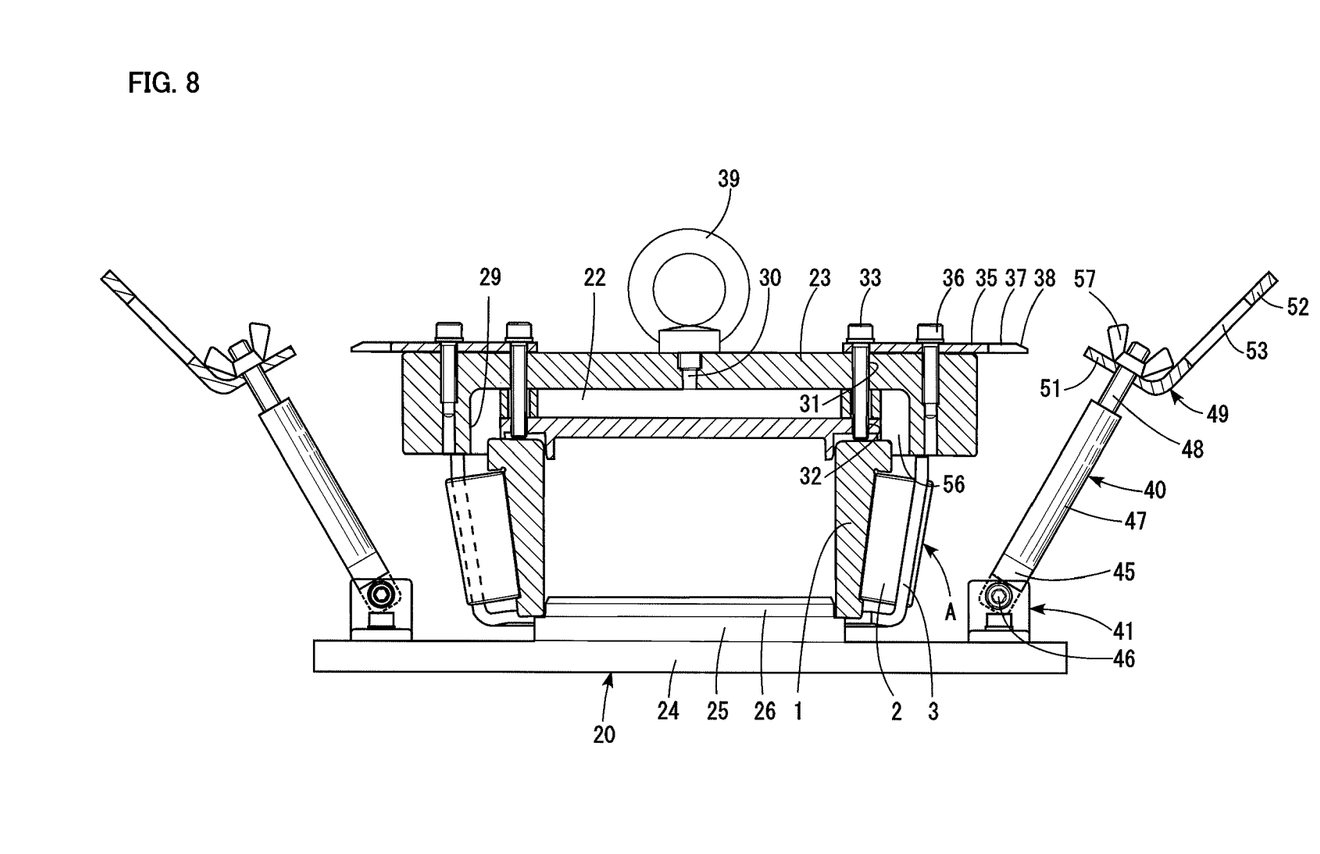
FIG. 8 is a front view of the embodiment in FIG. 2, showing a state where pressers are opened in left-right directions.
Figure 9:
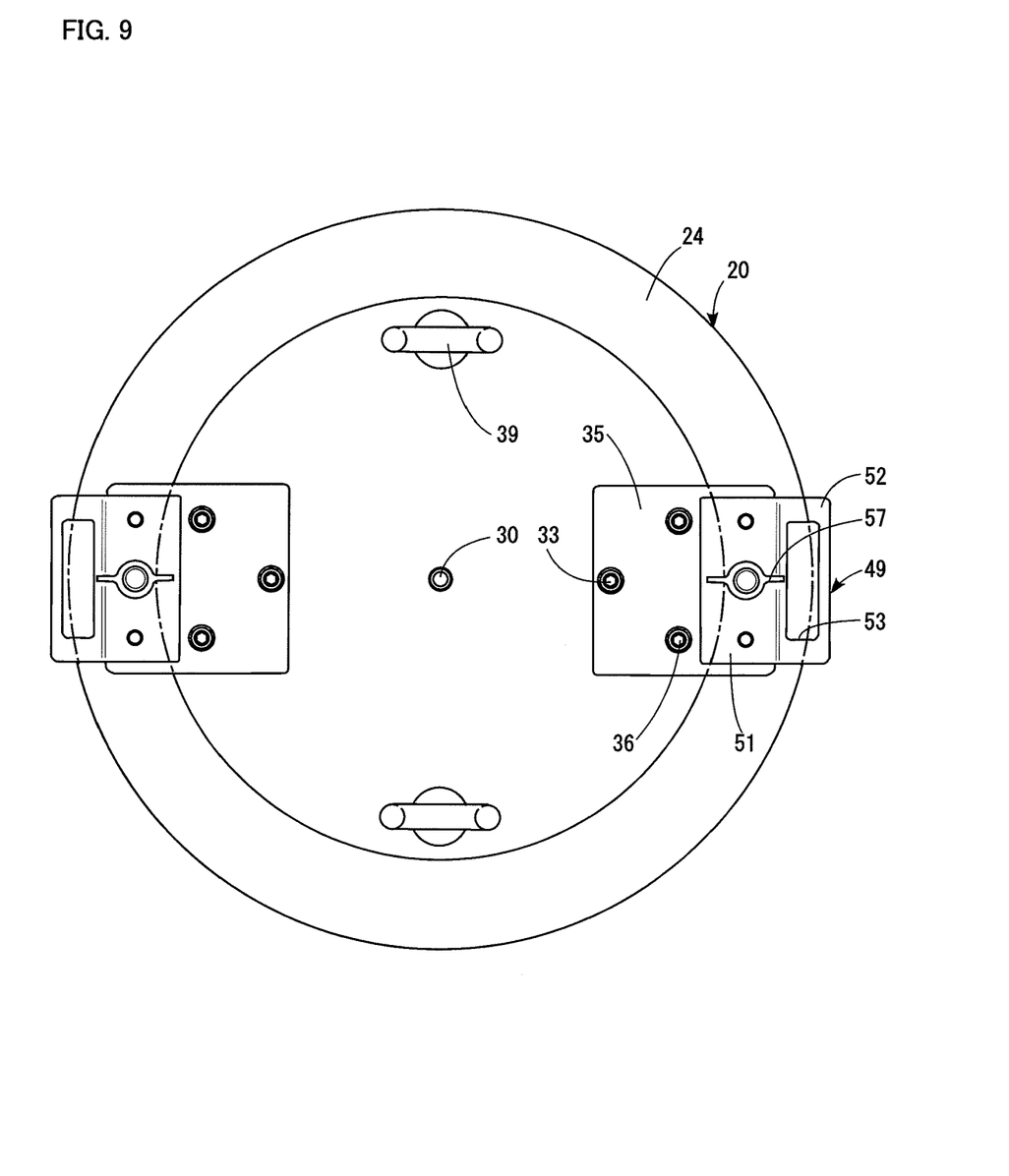
FIG. 9 is a plan view of the embodiment in FIG. 2, showing an assembled state thereof.

Next, a second embodiment of the grease packing jig according to the present invention will be described with reference to FIG. 7 through FIG. 9.

In the first embodiment, the upper surface of the upper lid 23 is pressed by spring forces from the coil springs 54 provided around the holding rods 40. In the second embodiment, holding rods 40 have their end portions tightened with wing nuts 57 to prevent the upper lid 23 and the inner lid 21 from being lifted.

Except for the arrangement to tighten the tips of the holding rods 40 with wing nuts 57, the embodiment is exactly the same as the first embodiment, so the same reference symbols will be assigned to the same elements in the drawings and no more description will be made here.

The second embodiment require an additional step of tightening the wing nuts 57 after pivoting the holding rods 40 from the state of being opened in the left-right directions to the state where holding rods 40 are raised upright. An advantage, however, is that the wing nuts 57 can be tightened firmly to prevent the inner lid 21 and the upper lid 23 more reliably from being lifted than pressing by spring forces.

REFERENCE SIGNS LIST

A bearing
1 inner ring
2 rolling element
3 retainer
20 support table
21 inner lid
22 grease pumping space
23 upper lid
24 table plate
25 inner ring placement seat
26 inner ring fitting portion
27 annular wall 28 annular groove
29 inner lid housing recess
30 grease pumping port
31, 32 bolt hole
33 bolt
34 positioning ring
35 engagement plate
36 bolt
37 cutout
38 tapered guide
39 lifting eye
40 holding rod
41 rod bracket
42 fixing bolt
43 base plate portion
44 upright wall
45 platy portion
46 bolt
47 large diameter portion
48 small diameter portion
49 holding plate
50 insertion hole
51 horizontal plate portion
52 slanted plate portion
53 grip hole
54 coil spring
55 pressure nut
56 grease packing port
57 wing nut

The invention claimed is:

1. A grease packing jig for a bearing, comprising:
a support table for supporting a bearing which has an inner ring and a plurality of rolling elements arranged equidistantly on an outer circumferential surface of the inner ring by means of a retainer, with a first end surface of the inner ring facing downward;
a disc-shaped inner lid for covering at least part of a second end surface of the inner ring;
a disc-shaped upper lid having a larger diameter than the inner lid, and including a grease pumping port, and a lower surface formed with an inner lid housing recess for housing the inner lid such that a grease pumping space is formed between the lower surface of the upper lid and an upper surface of the inner lid as well as between the lower surface of the upper lid and an outer circumferential surface of the inner lid so that grease can be packed into a gap space in the bearing from a grease packing port provided between an inner circumferential surface of the inner lid housing recess in the upper lid and the outer circumferential surface of the inner lid;
a first presser disposed on the support table and configured to engage with an upper surface of the upper lid and press the upper lid downward, wherein the first presser includes:
 a holding rod provided at a first location on an upper surface of the support table such that the holding rod of the first presser pivots outwardly with respect to the support table, and
 a holding plate configured to engage the upper surface of the upper lid and press the upper surface of the upper lid with a spring when the holding rod of the first presser is raised to an upright position; and
a second presser disposed on the support table and configured to engage with the upper surface of the upper lid and press the upper lid downward, wherein the second presser includes:
 a holding rod provided at a second location on the upper surface of the support table such that the holding rod of the second presser pivots outwardly with respect to the support table, and
 a holding plate configured to engage the upper surface of the upper lid and press the upper surface of the upper lid with a spring when the holding rod of the second presser is raised to an upright position.

2. The grease packing jig for a bearing according to claim 1, wherein the first presser and the second presser are disposed equiangularly on an outer periphery of the upper surface of the support table.

3. The grease packing jig for a bearing according to claim 1, wherein the upper lid includes a first engagement plate and a second engagement plate, each being fixed to the upper surface of the upper lid so as to extend out of an outer circumference of the upper lid, and including an extended portion formed with a cutout for engagement by a portion of the respective holding rod below the respective holding plate when the respective holding rod is raised to the respective upright position.

4. The grease packing jig for a bearing according to claim 3, wherein each of the first engagement plate and the second engagement plate includes a tip formed with a tapered guide on an upper surface side of the respective engagement plate.

5. The grease packing jig for a bearing according to claim 1, wherein each of the holding rods of the first presser and the second presser has an upper end provided with an adjusting nut for adjustment of a spring force from the respective spring.

6. The grease packing jig for a bearing according to claim 1, wherein the inner lid has a lower surface formed with a positioning-purpose annular wall for insertion along an inner circumference of the inner ring.

7. The grease packing jig for a bearing according to claim 1, wherein each of the holding rods of the first presser and the second presser is configured to press the upper surface of the upper lid with a tightening force of a nut when the respective holding rod is raised to the respective upright position.

8. The grease packing jig for a bearing according to claim 7, wherein the nut of the holding rod of the first presser is a wing nut and the nut of the holding rod of the second presser is a wing nut.

9. The grease packing jig for a bearing according to claim 1, wherein the holding rod of the first presser and the holding rod of the second presser are configured to pivot independently of each other.

10. The grease packing jig for a bearing according to claim 1, wherein the holding plate of the first presser is attached to the holding rod of the first presser so as to pivot with the holding rod of the first presser and the holding plate of the second presser is attached to the holding plate of the second presser so as to pivot with the holding rod of the second presser.

11. The grease packing jig for a bearing according to claim 1, wherein each of the holding rods of the first presser and the second presser has a first plate portion and a second plate portion that is slanted with respect to the first plate portion.

* * * * *